(12) United States Patent
Luo et al.

(10) Patent No.: US 12,525,406 B2
(45) Date of Patent: Jan. 13, 2026

(54) HFO$_2$-BASED FERROELECTRIC CAPACITOR AND PREPARATION METHOD THEREOF, AND HFO$_2$-BASED FERROELECTRIC MEMORY

(71) Applicant: INSTITUTE OF MICROELECTRONICS OF THE CHINESE ACADEMY OF SCIENCES, Beijing (CN)

(72) Inventors: Qing Luo, Beijing (CN); Pengfei Jiang, Beijing (CN); Hangbing Lv, Beijing (CN); Yuan Wang, Beijing (CN); Ming Liu, Beijing (CN)

(73) Assignee: INSTITUTE OF MICROELECTRONICS OF THE CHINESE ACADEMY OF SCIENCES, Beijing (CN)

( * ) Notice: Subject to any disclaimer, the term of this patent is extended or adjusted under 35 U.S.C. 154(b) by 639 days.

(21) Appl. No.: 17/784,544

(22) PCT Filed: Jul. 9, 2020

(86) PCT No.: PCT/CN2020/100984
§ 371 (c)(1),
(2) Date: Jun. 10, 2022

(87) PCT Pub. No.: WO2021/253527
PCT Pub. Date: Dec. 23, 2021

(65) Prior Publication Data
US 2023/0015379 A1  Jan. 19, 2023

(30) Foreign Application Priority Data
Jun. 18, 2020 (CN) .......................... 202010564042.3

(51) Int. Cl.
H01G 9/042 (2006.01)
H01G 9/048 (2006.01)
H01G 9/07 (2006.01)

(52) U.S. Cl.
CPC ............. *H01G 9/042* (2013.01); *H01G 9/048* (2013.01); *H01G 9/07* (2013.01)

(58) Field of Classification Search
CPC ...... H10B 53/00–50; H10B 12/03–038; H10B 12/033; H01G 4/005
See application file for complete search history.

(56) References Cited

U.S. PATENT DOCUMENTS 10,403,631 B1 * 9/2019 Lu ..................... H01L 21/76829
2003/0219942 A1 * 11/2003 Choi ................. C23C 16/45542
257/E21.018

(Continued)

FOREIGN PATENT DOCUMENTS

CN   102295263 A   12/2011
CN   110970404 A   4/2017

(Continued)

OTHER PUBLICATIONS

International Search Report corresponding to International Application No. PCT/CN2020/100984, dated Dec. 23, 2021, 5 pages.

(Continued)

*Primary Examiner* — Evren Seven
(74) *Attorney, Agent, or Firm* — Analects Legal LLC

(57) ABSTRACT

A HfO$_2$-based ferroelectric capacitor and a preparation method therefor, and a HfO$_2$-based ferroelectric memory, relating to the technical field of microelectronics. The purpose of enlarging the memory window of the ferroelectric memory is achieved by inserting an Al$_2$O$_3$ intercalation layer having a coefficient of thermal expansion smaller than TiN between a dielectric layer and an upper electrode (TiN) of (Continued)

the ferroelectric capacitor. The $HfO_2$-based ferroelectric capacitor comprises a substrate layer, a lower electrode, a dielectric layer, an $Al_2O_3$ intercalation layer, an upper electrode and a metal protection layer from bottom to top. The memory window can be increased, information misreading is effectively prevented, and therefore, the reliability of the memory is improved.

11 Claims, 1 Drawing Sheet

(56) References Cited

U.S. PATENT DOCUMENTS

| | | | |
|---|---|---|---|
| 2005/0277208 A1* | 12/2005 | Nakazawa | H10D 1/694 |
| | | | 257/E21.664 |
| 2006/0046380 A1* | 3/2006 | Choi | H10D 1/68 |
| | | | 438/238 |
| 2012/0021612 A1 | 1/2012 | Nakagawa | |
| 2013/0153986 A1 | 6/2013 | Ahn et al. | |
| 2017/0162250 A1* | 6/2017 | Slesazeck | G11C 11/221 |
| 2017/0256552 A1* | 9/2017 | Schröder | G11C 11/2273 |
| 2018/0166453 A1* | 6/2018 | Müller | H10B 53/30 |
| 2019/0074295 A1* | 3/2019 | Schröder | H10D 30/0415 |
| 2019/0259778 A1* | 8/2019 | Yoo | G11C 11/5657 |
| 2019/0311756 A1* | 10/2019 | Sharma | G11C 11/22 |
| 2020/0105633 A1 | 4/2020 | Lee et al. | |
| 2020/0105770 A1* | 4/2020 | Yoo | G11C 11/221 |
| 2020/0194443 A1* | 6/2020 | Lin | G11C 11/221 |
| 2020/0286985 A1* | 9/2020 | Lim | H10D 64/256 |
| 2020/0402986 A1* | 12/2020 | Lu | H10B 53/30 |
| 2021/0174855 A1* | 6/2021 | Lin | G11C 11/22 |
| 2021/0335799 A1* | 10/2021 | Lee | H01L 28/40 |
| 2021/0359082 A1* | 11/2021 | Kang | H10D 64/691 |
| 2021/0359100 A1* | 11/2021 | Maeng | H01L 29/513 |
| 2021/0359101 A1* | 11/2021 | Heo | H10D 30/0415 |

FOREIGN PATENT DOCUMENTS

| | | |
|---|---|---|
| CN | 109935590 A | 6/2019 |
| CN | 111261774 A | 6/2020 |
| WO | 2010098121 A1 | 9/2010 |

OTHER PUBLICATIONS

Written Opinion corresponding to International Application No. PCT/CN2020/100984, dated Dec. 23, 2021, 6 pages.
1st Chinese Office Actions corresponding to Chinese Application No. 202010564042.3, dated Sep. 23, 2021, 14 pages.
2nd Chinese Office Actions corresponding to Chinese Application No. 202010564042.3, dated Apr. 12, 2022, 10 pages.
"Ferroelectric Tunnel Junctions based on Ferroelectric-Dielectric $Hf_{0.5}Zr_{0.5}O_2$/ $Al_2O_3$ Capacitor Stacks", Authors: Benjamin Max, Michael Hoffman and Stefan Slesazeck and Thomas Mikolajick, IEEE Xplore, Oct. 11, 2018; 142-145.
"Ferroelectric Polarization Switching of Hafnium Zirconium Oxide in a Ferroelectric/Dielectric Stack", Authors: Mengwei Si, Xial Lyu, and Peide D. Ye, Applied Electronic Materials, ACS Publications, 2019 American Chemical Society, 745-751.

* cited by examiner

HFO$_2$-BASED FERROELECTRIC CAPACITOR AND PREPARATION METHOD THEREOF, AND HFO$_2$-BASED FERROELECTRIC MEMORY

TECHNICAL FIELD

The present application belongs to the technical field of microelectronics, and relates to a hafnium dioxide (HfO$_2$)-based ferroelectric capacitor and a preparation method thereof, and a HfO$_2$-based ferroelectric memory.

BACKGROUND

With the development of the integrated circuit (IC) industry, flash memory devices representing the advanced level of today's non-volatile semiconductor memory are constantly emerging with new structures and design solutions. However, the flash memory devices still suffer from slow read and write speeds, high operating voltages, limited number of cycles, and scaling limitations. While traditional flash memory devices are improved and developed, a variety of novel non-volatile memories are also under extensive research. Among them, ferroelectric random access memory (FeRAM) is a new representative device. The cell structure of the ferroelectric memory, similar to that of the dynamic random access memory (DRAM), is composed of a metal-oxide-semiconductor field-effect transistor (MOSFET) and a ferroelectric capacitor. The ferroelectric capacitor is configured to store data and includes top and bottom electrodes and a dielectric layer in a sandwich structure. The dielectric layer is ferroelectric and has a polarization hysteresis curve. The polarization direction of the ferroelectric domain represents stored data of binary "0" and "1", and the remanent polarization represents the memory window. The polarization reversal time of the ferroelectric domain is on the order of nanoseconds, so the ferroelectric memory has fast write speed and low energy consumption.

Conventional ferroelectric materials with the perovskite structure have many defects. First, these ferroelectric materials are complex in chemical composition, difficult to prepare, and can hardly be compatible with the existing complementary metal-oxide-semiconductor (CMOS) process. Second, these ferroelectric materials have a small forbidden band width. In order to ensure the leakage current level, it is hard to shrink the thickness of the film to the level of the existing process node. Some conventional ferroelectric materials, lead zirconium titanate (PZT), are even banned in some countries due to the presence of toxic lead. Due to these defects, Conventional ferroelectric materials have always been difficult to formally enter the market. Recently, a doped-HfO$_2$-based ferroelectric material has been proposed. The ferroelectric material has a mature atomic layer deposition (ALD) process that is compatible with the existing standard CMOS process. In addition, the ferroelectric material has a larger forbidden band width than the conventional ferroelectric materials, and it has been confirmed to have ferroelectricity at a thickness of about 5 nm. Therefore, the ferroelectric material can be applied to a three-dimensional (3D) structure to greatly improve the integration degree, which makes the HfO$_2$-based ferroelectric memory a new generation of non-volatile semiconductor memory with great development potential.

It has been confirmed that ferroelectricity arises due to the presence of a non-centrosymmetric orthorhombic phase (o-phase, space group Pca2$_1$). Under normal temperature and pressure, the bulk phase of HfO$_2$ is a centrosymmetric monoclinic phase (m-phase, space group P2$_1$/c), which does not have ferroelectricity. During the annealing and crystallization process, the material is subjected to asymmetric stress, so a transition from the m-phase to the o-phase occurs, making the film appear ferroelectric. The ratio of the o-phase determines the ferroelectricity of the material, which is intuitively reflected by the remanent polarization ($P_r$), one of the key parameters of the ferroelectric memory. Usually, the memory window of the memory is regarded as $2P_r$. A large memory window can effectively prevent misreading of data, thereby improving the reliability of the memory.

SUMMARY

The present application provides a HfO$_2$-based ferroelectric capacitor and a preparation method thereof, and a HfO$_2$-based ferroelectric memory.

The present application is also applicable to a ferroelectric memory based on HfO$_2$ doped with other elements Si, Y, Gd, etc).

The objective of the present application is mainly achieved by the following technical solutions.

The present application provides a HfO$_2$-based ferroelectric capacitor, which includes a substrate layer, a bottom electrode, a dielectric layer, an Al$_2$O$_3$ intercalation layer, a top electrode and a metal protective layer in sequence from bottom to top.

Further, the substrate layer may be made of SiO$_2$/Si or SiO$_2$.

Further, the bottom electrode may be made of TiN, with a thickness of 10-60 nm.

Further, the dielectric layer may be made of HZO, with a thickness of 8-15 nm, and a molar ratio of Hf to Zr being (0.4-0.6):(0.4-0.6).

Further, the Al$_2$O$_3$ intercalation layer may have a thickness of 2-3 nm.

Further, the top electrode may be made of TiN, with a thickness of 10-60 nm.

The present application further provides a preparation method of a HfO$_2$-based ferroelectric capacitor, including the following steps:
  providing and cleaning a substrate layer;
  preparing a bottom electrode on the cleaned substrate layer by a sputtering process;
  depositing a dielectric layer on the bottom electrode;
  depositing an Al$_2$O$_3$ intercalation layer on the dielectric layer;
  applying a photoresist on the Al$_2$O$_3$ intercalation layer, exposing and developing;
  preparing a top electrode on the Al$_2$O$_3$ intercalation layer treated as above by a sputtering process;
  preparing a metal protective layer on the top electrode by a sputtering process; and
  removing the photoresist and excess metal, and annealing.

Further, the applying a photoresist on the Al$_2$O$_3$ intercalation layer, exposing and developing may include: applying a negative photoresist on the Al$_2$O$_3$ intercalation layer, and prebaking for 1 min at 150° C.; exposing, and post-baking for 1 min at 120° C.; developing by soaking in a developer for 30 s; rinsing with deionized water; and blowing dry.

Further, the removing the photoresist and excess metal may include: soaking in an acetone solution until the photoresist and excess metal come off, soaking in absolute ethanol to remove acetone; rinsing with deionized water; and blowing dry.

The present application further provides a $HfO_2$-based ferroelectric memory, including the above $HfO_2$-based ferroelectric capacitor or a $HfO_2$-based ferroelectric capacitor prepared by the above preparation method.

The present application has at least one of the following technical effects:

1) In the present application, the $Al_2O_3$ intercalation layer with a thermal expansion coefficient smaller than TiN is inserted between the dielectric layer and the top electrode (TiN) of the ferroelectric capacitor to provide larger tensile stress during annealing, thereby increasing the ratio of the o-phase component in the dielectric layer. In this way, the present application achieves the purpose of increasing the remanent polarization and increasing the memory window of the ferroelectric memory, thereby effectively preventing misreading of data and improving the reliability of the memory.

2) When the dielectric layer is made of HZO (hafnium-zirconium oxide), the molar ratio of Hf to Zr is (0.4-0.6):(0.4-0.6), and the thickness of the dielectric layer is 8-15 nm. Under this condition, the dielectric layer has the strongest ferroelectricity.

Other features and advantages of the present application will be described in the following specification, and some of these will become apparent from the specification or be understood by implementing the present application. The objectives and other advantages of the present application may be achieved by the structure specifically indicated in the specification and drawings.

BRIEF DESCRIPTION OF THE DRAWINGS

The drawings are provided merely for illustrating specific embodiments and are not considered as limiting the present application. The same reference numerals denote the same components throughout the drawings.

Figure 1:
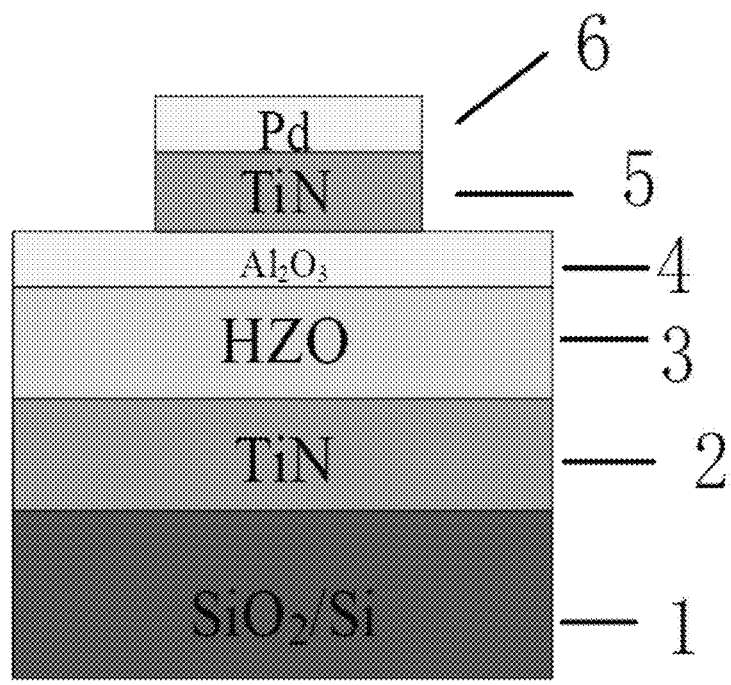
FIG. 1 is a structural diagram of a $HfO_2$-based ferroelectric capacitor according to Embodiment 1.

Illustrative features are assigned the following reference numerals: 1. substrate layer; 2. bottom electrode; 3. dielectric layer; 4. $Al_2O_3$ intercalation layer; 5. top electrode; and 6. metal protective layer.

DETAILED DESCRIPTION OF THE EMBODIMENTS

The present application provides a $HfO_2$-based ferroelectric capacitor and a preparation method thereof, and a $HfO_2$-based ferroelectric memory. The technical solutions of the present application are further described in detail below with reference to the specific embodiments. However, these embodiments are only intended for the purpose of comparison and explanation, and the present application is not limited thereto.

Various structural diagrams according to the embodiments of the present application are shown in the drawings. These drawings are not drawn to scale, in which some details are enlarged to be seen clearly, and some details may be omitted. The shapes of various regions and layers shown in the drawings and relative sizes and positional relationships thereof are merely exemplary, which may be different due to manufacturing tolerances or technical limitations in practice, and those skilled in the art may additionally design regions/layers with different shapes, sizes and relative positions according to actual needs.

In the context of the present application, when a layer/element is "on" another layer/element, it may be directly on the another layer/element, or there may be an intermediate layer/element present there-between. In addition, if a layer/element is "on" another layer/element in one orientation, the layer/element may be "under" the another layer/element when the orientation is reversed.

One aspect of the present application provides a $HfO_2$-based ferroelectric capacitor, which includes a substrate layer 1, a bottom electrode 2, a dielectric layer 3, an $Al_2O_3$ intercalation layer 4, a top electrode 5 and a metal protective layer 6 in sequence from bottom to top.

The substrate layer 1 may be made of $SiO_2$ alone or $SiO_2$/Si arranged from top to bottom. When the material of the substrate layer 1 is $SiO_2$/Si, preferably, the thickness of $SiO_2$ is 100-500 nm, and the thickness of Si is 300-600 μm.

The bottom electrode 2 and the top electrode 5 are both made of TiN. Preferably, the thickness of the TiN is 10-60 nm. If the thickness of the TiN is less than 10 nm, the TiN may lose ferroelectricity, and if the thickness of the TiN is greater than 60 nm, it will cause waste. Exemplarily, the thickness of the TiN is 40 nm. The dielectric layer 3 is a $HfO_2$-based material. Exemplarily, the dielectric layer 3 is HZO (hafnium-zirconium oxide), with a thickness of 8-15 nm and a molar ratio of Hf to Zr being (0.4-0.6):(0.4-0.6). Under this condition, HZO has the strongest ferroelectricity. Exemplarily, the thickness of the HZO is 10 nm. Preferably, the molar ratio of Hf to Zr is 1:1, and under this condition, the ferroelectricity of the dielectric layer 3 is the strongest. The dielectric layer 3 may also be made of a $HfO_2$-based material doped with other elements (Si, Y, Gd, etc).

Figure 2:
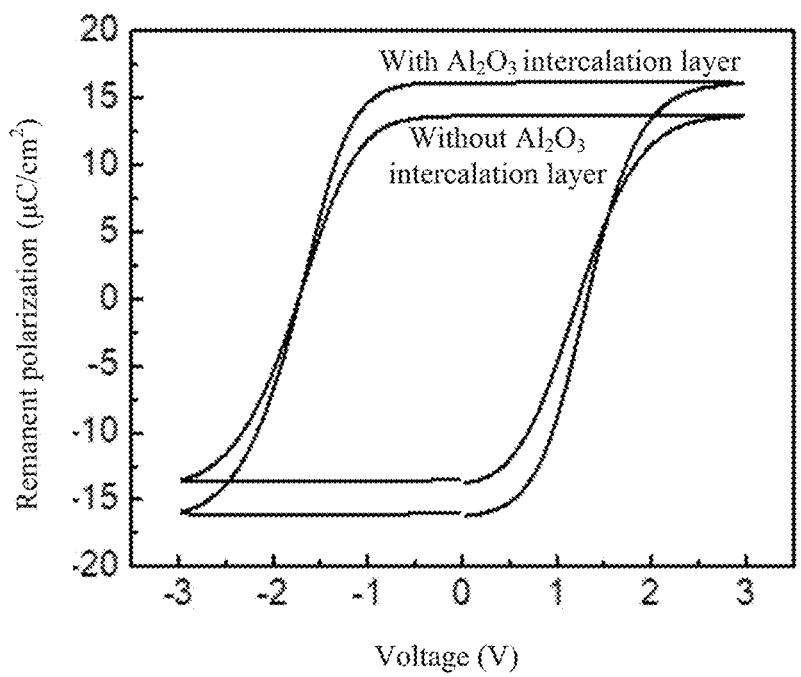
FIG. 2 is a comparison diagram of remanent polarization ($P_r$) and voltage (V) of a $HfO_2$-based ferroelectric capacitor with an $Al_2O_3$ intercalation layer according to Embodiment 1 and a $HfO_2$-based ferroelectric capacitor without an $Al_2O_3$ intercalation layer.

As shown in FIG. 2, in the present application, the $Al_2O_3$ intercalation layer with a thermal expansion coefficient smaller than TiN is inserted between the dielectric layer and the top electrode (TiN) of the ferroelectric capacitor to provide larger tensile stress during annealing, thereby increasing the ratio of the o-phase component in the dielectric. In this way, the present application achieves the purpose of increasing the remanent polarization and increasing the memory window of the ferroelectric memory, thereby effectively preventing misreading of data and improving the reliability of the memory. Preferably, the thickness of the $Al_2O_3$ intercalation layer 4 is 2-3 nm. If the intercalation layer is too thin, the stress is not obvious, and if the intercalation layer is too thick, it will have a great influence on the electrical characteristics of the device, causing dielectric interference and resistive voltage division.

The metal protective layer 6 is made of an inert metal Pd, Au and Pt, and has a thickness of 10-30 nm, exemplarily, 20 nm.

Another aspect of the present application provides a preparation method of a $HfO_2$-based ferroelectric capacitor, including the following steps:

Step 1: Clean a substrate layer 1: soak the substrate layer with acetone and absolute ethanol in sequence, clean, and blow dry; and then soak with deionized water, rinse, and blow dry.

Step 2: Prepare a bottom electrode 2 on the substrate layer 1 by an ion beam sputtering (IBS) process.

The sputtering process includes, but is not limited to, IBS, direct current (DC) sputtering, reactive sputtering, etc. Exemplarily, IBS is used with the following parameters: TiN target; beam voltage: 700-900 V; beam current: 40-60 mA: accelerating voltage: 150-170 V; and sputtering gas: a mixture of Ar and $N_2$, with flow rates of (7-9 sccm)/(4-6 sccm), respectively. With these process parameters, better film contrast can be achieved, which facilitates the generation of ferroelectricity.

Step 3: Deposit a dielectric layer 3 on the bottom electrode 2.

Exemplarily, a dielectric layer is prepared from HZO by an atomic layer deposition (ALD) process. During deposition, a layer of $ZrO_2$ is formed first, and then a layer of $HfO_2$ is formed, which are cycled in sequence, and finally a layer of $ZrO_2$ is formed to cap. Different precursors and oxygen sources may be selected, and the deposition temperature is usually 280-300° C. The precursors of Zr and Hf are heated to 100-140° C., and deionized water is kept at room temperature of 20° C. The carrier gas is $N_2$, with a flow rate of 40-80 sccm. Exemplarily, the precursor of Hf adopts tetrakis (ethylmethylamido)hafnium (IV) (TEMAH), $Hf(NCH_3C_2H_5)_4$. The precursor of Zr adopts tetrakis(ethylmethylamido)zirconium (IV) (TEMAZ), $Zr(NCH_3CH_5)_4$. The deionized water is used as the oxygen source.

Step 4: Deposit an $Al_2O_3$ intercalation layer 4 on the dielectric layer 3 by an ALD process.

Exemplarily, trimethylaluminum (TMA), $Al(CH_3)_3$, is selected as the precursor of Al, and deionized water is used as the oxygen source. The deposition temperature is 280-300° C. The precursor of Al and the deionized water are kept at room temperature of 20° C. The carrier gas is $N_2$, with a flow rate of 40-80 sccm.

Step 5: Apply a photoresist, expose and develop.

Specifically, a negative photoresist is applied on the $Al_2O_3$ intercalation layer 4, and prebaked for 1 min at 150° C. Then exposure is performed, and the negative photoresist is post-baked for 1 min at 120° C. The intercalation layer is soaked in a developer for 30 s to develop, and is rinsed with deionized water and blown dry.

Step 6: Prepare a top electrode 5 by a sputtering process.

The sputtering process includes, but is not limited to, IBS, DC sputtering, reactive sputtering, etc. Exemplarily, IBS is used with the following parameters: TiN target; beam voltage: 700-900 V; beam current: 40-60 mA: accelerating voltage: 150-170 V; and sputtering gas: a mixture of Ar and $N_2$, with flow rates of (7-9 sccm)/(4-6 sccm), respectively. With these process parameters, better film contrast can be achieved, which facilitates the generation of ferroelectricity.

Step 7: Prepare a metal protective layer 6 by a sputtering process.

Exemplarily, IBS is used with the following parameters: Pd target; beam voltage: 700-900 V; beam current: 40-60 mA: accelerating voltage: 150-170 V; and sputtering gas: Ar, with a flow rate of 7-9 sccm.

Step 8: Remove the photoresist and excess metal.

This step specifically includes the following sub-steps:

Step 801: Soak in an acetone solution until the photoresist and excess metal come off.

Step 802: Soak in absolute ethanol to remove acetone.

Step 803: Rinse with deionized water and blow dry.

Step 9: Anneal: perform rapid thermal annealing (RTA) at 400-500° C. in $N_2$ for less than 1 min, preferably, 20-30 s.

The present application further provides a $HfO_2$-based ferroelectric memory, including the above $HfO_2$-based ferroelectric capacitor.

The present application has the following advantages:

The present application adds the $Al_2O_3$ intercalation layer to provide more tensile stress during annealing. Compared with a $HfO_2$-based ferroelectric capacitor without $Al_2O_3$ intercalation, in the present application, both the ratio of the o-phase component in the dielectric layer and the remanent polarization of the dielectric layer are increased, thereby achieving the purpose of increasing the memory window. In addition, the present application has a simple technical process and an obvious effect.

Embodiment 1

As shown in FIG. 1, a $HfO_2$-based ferroelectric capacitor includes a $SiO_2$/Si substrate layer 1, a bottom electrode 2, a dielectric layer 3, an $Al_2O_3$ intercalation layer 4, a top electrode 5 and a metal protective layer 6 in sequence from bottom to top.

A preparation method of the $HfO_2$-based ferroelectric capacitor specifically includes the following steps:

First, a $SiO_2$/Si substrate layer is provided, which includes a 300 nm thick upper layer $SiO_2$ and a 500 µm thick lower layer Si. The substrate layer is soaked and cleaned in acetone and absolute ethanol in sequence for 3 min, and blown dry. The substrate layer is then soaked and rinsed with deionized water for 3 min and blown dry, thereby completing the cleaning of the substrate layer.

Second, the bottom electrode is prepared from TiN on the cleaned $SiO_2$/Si substrate layer by an IBS process: TiN target; beam voltage: 800 V; beam current: 46 mA, accelerating voltage: 160 V; and sputtering gas: a mixture of Ar and $N_2$, with flow rates of 8 sccm/5 sccm, respectively. The bottom electrode TiN may have a thickness of 40 nm.

Third, the dielectric layer is prepared from HZO on the bottom electrode by an ALD process. TEMAH and TEMAZ are used as precursors of Hf and Zr, and deionized water is used as the oxygen source. The deposition temperature is 280° C. The precursors of Zr and Hf are heated to 120° C., and the deionized water is kept at room temperature of 20° C. $N_2$ is selected as the carrier gas, with a flow rate of 50 sccm. During deposition, a layer of $ZrO_2$ is formed first, and then a layer of $HfO_2$ is formed, which are cycled in sequence, and finally a layer of $ZrO_2$ is formed to cap. The deposition rates are 0.72 Å/cycle (i.e. 0.72 Å per cycle) ($ZrO_2$) and 0.75 Å/cycle (i.e. 0.75 Å per cycle) ($HfO_2$), ensuring that the stoichiometric ratio of Hf to Zr is approximately equal to 1:1. That is, the ratio of Hf to Zr is 1:1. When the thickness of the dielectric layer reaches 10 nm, the preparation of the dielectric layer is completed.

Fourth, the intercalation layer is prepared from $Al_2O_3$ on the HZO dielectric layer by an ALD process. TMA is selected as the precursor of Al and deionized water is used as the oxygen source. The deposition temperature is 300° C. The precursor of Al and the deionized water are kept at room temperature of 20° C. The carrier gas is $N_2$, with a flow rate of 50 sccm, and the deposition rate is 0.96 Å/cycle. The $Al_2O_3$ intercalation layer may have a thickness of 2 nm.

After the $Al_2O_3$ intercalation layer is formed, a negative photoresist is applied on the $Al_2O_3$ intercalation layer, and prebaked for 1 min at 150° C. Then exposure is performed, and the negative photoresist is post-baked for 1 min at 120° C. The intercalation layer is soaked in a developer for 30 s to develop, and is rinsed with deionized water and blown dry.

Fifth, the top electrode is prepared from TiN on the $Al_2O_3$ intercalation layer by an IBS process: TiN target; beam voltage: 800 V; beam current: 46 mA; accelerating voltage: 160 V; and sputtering gas: a mixture of Ar and $N_2$, with flow rates of 8 sccm/5 sccm, respectively. The top electrode has a thickness of 40 nm.

Sixth, the metal protective layer is prepared from Pd on the formed top electrode by an IBS process: Pd target; beam voltage: 800 V; beam current: 46 mA; accelerating voltage:

160 V; and sputtering gas: Ar, with a flow rate of 8 sccm. The metal protective layer has a thickness of 20 nm.

Seventh, the $HfO_2$-based ferroelectric device with the substrate layer, the bottom electrode, the dielectric layer, the $Al_2O_3$ intercalation layer, the top electrode and the metal protective layer obtained by the above operation is soaked in an acetone solution until the photoresist and excess metal come off. Then it is soaked in absolute ethanol to remove acetone, and is rinsed with deionized water and blown dry.

Finally, the dried $HfO_2$-based ferroelectric device is annealed at 500° C. for 30 s in $N_2$ to obtain a $HfO_2$-based ferroelectric capacitor.

Embodiment 2

A preparation method of the $HfO_2$-based ferroelectric capacitor specifically includes the following steps:

First, a $SiO_2$/Si substrate layer is provided, which includes a 200 nm thick upper layer $SiO_2$ and a 400 μm thick lower layer Si. The substrate layer is soaked and cleaned in acetone and absolute ethanol in sequence for 5 min, and blown dry. The substrate layer is then soaked and rinsed in deionized water for 5 min and blown dry, thereby completing the cleaning of the substrate layer.

Second, the bottom electrode is prepared from TiN on the cleaned $SiO_2$/Si substrate layer by an IBS process: TiN target; beam voltage: 700 V; beam current: 40 mA; accelerating voltage: 150 V; and sputtering gas: a mixture of Ar and $N_2$, with flow rates of 7 sccm/4 sccm, respectively. The bottom electrode TiN may have a thickness of 60 nm.

Third, the dielectric layer is prepared from HZO on the prepared bottom electrode by an ALD process. TEMAH and TEMAZ are used as precursors of Hf and Zr, and deionized water is used as the oxygen source. The deposition temperature is 290° C. The precursors of Zr and Hf are heated to 100° C., and the deionized water is kept at room temperature of 20° C. $N_2$ is selected as the carrier gas, with a flow rate of 60 sccm. During deposition, a layer of $ZrO_2$ is formed first, and then a layer of $HfO_2$ is formed, which are cycled in sequence, and finally a layer of $ZrO_2$ is formed to cap. The molar ratio of Hf to Zr is 0.4:0.6. When the thickness of the dielectric layer is 10 nm, the preparation of the dielectric layer is completed.

Fourth, the intercalation layer is prepared from $Al_2O_3$ on the HZO dielectric layer by an ALD process. TMA is chosen as the precursor of Al and deionized water is used as the oxygen source. The deposition temperature is 280° C. The precursor of Al and the deionized water are kept at room temperature of 20° C. The carrier gas is $N_2$, with a flow rate of 60 sccm. The $Al_2O_3$ intercalation layer may have a thickness of 3 nm.

After the $Al_2O_3$ intercalation layer is formed, a negative photoresist is applied on the $Al_2O_3$ intercalation layer, and prebaked for 1 min at 150° C. Then exposure is performed, and the negative photoresist is post-baked for 1 min at 120° C. The intercalation layer is soaked in a developer for 30 s to develop, and is rinsed with deionized water and blown dry.

Fifth, the top electrode is prepared from TiN on the $Al_2O_3$ intercalation layer by an IBS process: TiN target; beam voltage: 700 V; beam current: 40 mA; accelerating voltage: 150 V; and sputtering gas: a mixture of Ar and $N_2$, with flow rates of 7 sccm/4 sccm, respectively. The top electrode has a thickness of 60 nm.

Sixth, the metal protective layer is prepared from Pd on the formed top electrode by an IBS process: Pd target; beam voltage: 700 V; beam current: 40 mA; accelerating voltage: 150 V; and sputtering gas: Ar, with a flow rate of 7 sccm. The metal protective layer has a thickness of 10 nm.

Seventh, the $HfO_2$-based ferroelectric device with the substrate layer, the bottom electrode, the dielectric layer, the $Al_2O_3$ intercalation layer, the top electrode and the metal protective layer obtained by the above operation is soaked in an acetone solution until the photoresist and excess metal come off. Then it is soaked in absolute ethanol to remove acetone, and is rinsed with deionized water and blown dry.

Finally, the dried $HfO_2$-based ferroelectric device is annealed at 400° C. for 25 s in $N_2$ to obtain an $HfO_2$-based ferroelectric capacitor.

Embodiment 3

A Preparation Method of the $HfO_2$-Based Ferroelectric Capacitor Includes the Following Steps:

First, a $SiO_2$/Si substrate layer is provided, which includes a 400 nm thick upper layer $SiO_2$ and a 600 μm thick lower layer Si. The substrate layer is soaked and cleaned in acetone and absolute ethanol in sequence for 3 min, and blown dry. The substrate layer is then soaked and rinsed in deionized water for 3 min and blown dry, thereby completing the cleaning of the substrate layer.

Second, the bottom electrode is prepared from TiN on the cleaned $SiO_2$/Si substrate layer by an IBS process: TiN target; beam voltage: 900 V; beam current: 60 mA; accelerating voltage: 170 V; and sputtering gas: a mixture of Ar and $N_2$, with flow rates of 9 sccm/6 sccm, respectively. The bottom electrode TiN may have a thickness of 20 nm.

Third, the dielectric layer is prepared from HZO on the prepared bottom electrode by an ALD process. TEMAH and TEMAZ are used as precursors of Hf and Zr, and deionized water is used as the oxygen source. The deposition temperature is 300° C. The precursors of Zr and Hf are heated to 140° C., and the deionized water is kept at room temperature of 20° C. $N_2$ is selected as the carrier gas, with a flow rate of 70 sccm. During deposition, a layer of $ZrO_2$ is formed first, and then a layer of $HfO_2$ is formed, which are cycled in sequence, and finally a layer of $ZrO_2$ is formed to cap. The molar ratio of Hf to Zr is 0.6:0.4, and the thickness of the dielectric layer is 15 nm.

Fourth, the intercalation layer is prepared from $Al_2O_3$ on the HZO dielectric layer by an ALD process. TMA is chosen as the precursor of Al and deionized water is used as the oxygen source. The deposition temperature is 290° C. The precursor of Al and the deionized water are kept at room temperature of 20° C. The carrier gas is $N_2$, with a flow rate of 70 sccm. The $Al_2O_3$ intercalation layer may have a thickness of 2 nm.

After the $Al_2O_3$ intercalation layer is formed, a negative photoresist is applied on the $Al_2O_3$ intercalation layer, and prebaked for 1 min at 150° C. Then exposure is performed, and the negative photoresist is post-baked for 1 min at 120° C. The intercalation layer is soaked in a developer for 30 s to develop, and is rinsed with deionized water and blown dry.

Fifth, the top electrode is prepared from TiN on the $Al_2O_3$ intercalation layer by an IBS process: TiN target; beam voltage: 900 V; beam current: 60 mA; accelerating voltage: 170 V; and sputtering gas: a mixture of Ar and $N_2$, with flow rates of 9 sccm/6 sccm, respectively. The top electrode has a thickness of 20 nm.

Sixth, the metal protective layer is prepared from Pd on the formed top electrode by an IBS process: Pd target; beam voltage: 900 V; beam current: 60 mA; accelerating voltage:

170 V; and sputtering gas: Ar, with a flow rate of 9 sccm. The metal protective layer has a thickness of 30 nm.

Seventh, the HfO$_2$-based ferroelectric device with the substrate layer, the bottom electrode, the dielectric layer, the Al$_2$O$_3$ intercalation layer, the top electrode and the metal protective layer obtained by the above operation is soaked in an acetone solution until the photoresist and excess metal come off. Then it is soaked in absolute ethanol to remove acetone, and is rinsed with deionized water and blown dry.

Finally, the dried HfO$_2$-based ferroelectric device is annealed at 450° C. for 20 s in N$_2$ to obtain a HfO$_2$-based ferroelectric capacitor.

In the above description, the technical details the composition and etching of each layer are not described. However, those skilled in the art should understand that layers and regions with desired shapes can be formed by various technical means. In addition, in order to form the same structure, those skilled in the art can also design a method that is not completely the same as the method described above. In addition, although the various embodiments are described above separately, this does not mean that the measures in the various embodiments cannot be used in combination.

The above merely describes preferred specific implementations of the present application, but a protection scope of the present application is not limited thereto. Any person skilled in the art can easily conceive modifications or replacements within the technical scope of the present application, and these modifications or replacements shall fall within the protection scope of the present application.

What is claimed is:

1. A hafnium dioxide (HfO2)-based ferroelectric capacitor, comprising a substrate layer, a bottom electrode, a dielectric layer, an Al2O3 intercalation layer, a top electrode and a metal protective layer in sequence from bottom to top;
   wherein the dielectric layer is made of HZO, with a thickness of 8-15 nm, and a molar ratio of Hf to Zr being (0.4-0.6):(0.4-0.6);
   wherein the Al2O3 intercalation layer with a thermal expansion coefficient smaller than TiN is inserted between the dielectric layer and the top electrode (TiN) of the ferroelectric capacitor to provide larger tensile stress during annealing, thereby increasing the ratio of the o-phase component in the dielectric layer to achieve the purpose of increasing the remanent polarization and increase the memory window of the ferroelectric memory, thereby effectively preventing misreading of data and improving the reliability of the memory;
   wherein the metal protective layer is made of one of Pd, Au and Pt; and
   wherein the annealing is performed at 400-500° C. in N2 for 20-30 s.

2. The HfO$_2$-based ferroelectric capacitor according to claim 1, wherein the substrate layer is made of SiO$_2$/Si.

3. The HfO$_2$-based ferroelectric capacitor according to claim 1, wherein the bottom electrode is made of TiN, with a thickness of 10-60 nm.

4. The HfO$_2$-based ferroelectric capacitor according to claim 1, wherein the Al$_2$O$_3$ intercalation layer has a thickness of 2-3 nm.

5. The HfO$_2$-based ferroelectric capacitor according to claim 1, wherein the top electrode is made of TiN, with a thickness of 10-60 nm.

6. A preparation method of a HfO2-based ferroelectric capacitor, comprising the following steps:
   providing and cleaning a substrate layer;
   preparing a bottom electrode on the cleaned substrate layer by a sputtering process;
   depositing a dielectric layer on the bottom electrode;
   depositing an Al2O3 intercalation layer on the dielectric layer;
   applying a photoresist on the Al2O3 intercalation layer, exposing and developing; preparing a top electrode on the Al2O3 intercalation layer treated as above by a sputtering process;
   preparing a metal protective layer on the top electrode by a sputtering process; and removing the photoresist and excess metal, and annealing;
   wherein the dielectric layer is made of HZO, with a thickness of 8-15 nm, and a molar ratio of Hf to Zr being (0.4-0.6):(0.4-0.6);
   wherein the Al2O3 intercalation layer with a thermal expansion coefficient smaller than TiN is inserted between the dielectric layer and the top electrode (TiN) of the ferroelectric capacitor to provide larger tensile stress during annealing, thereby increasing the ratio of the o-phase component in the dielectric layer to achieve the purpose of increasing the remanent polarization and increase the memory window of the ferroelectric memory, thereby effectively preventing misreading of data and improving the reliability of the memory;
   wherein the metal protective layer is made of one of Pd, Au and Pt; and
   wherein the annealing is performed at 400-500° C. in N2 for 20-30 s.

7. The preparation method of a HfO$_2$-based ferroelectric capacitor according to claim 6, wherein the applying a photoresist on the Al$_2$O$_3$ intercalation layer, exposing and developing comprises: applying a negative photoresist on the Al$_2$O$_3$ intercalation layer, and prebaking for 1 min at 150° C.; exposing, and post-baking for 1 min at 120° C.; developing by soaking in a developer for 30 s; rinsing with deionized water; and blowing dry.

8. The preparation method of a HfO$_2$-based ferroelectric capacitor according to claim 6, wherein the removing the photoresist and excess metal comprises: soaking in an acetone solution until the photoresist and excess metal come off; soaking in absolute ethanol to remove acetone; rinsing with deionized water; and blowing dry.

9. A HfO2-based ferroelectric memory, comprising
   a HfO2-based ferroelectric capacitor,
   the HfO2-based ferroelectric capacitor comprises a substrate layer, a bottom electrode, a dielectric layer, an Al2O3 intercalation layer, a top electrode and a metal protective layer in sequence from bottom to top;
   wherein the dielectric layer is made of HZO, with a thickness of 8-15 nm, and a molar ratio of Hf to Zr being (0.4-0.6):(0.4-0.6);
   wherein the Al2O3 intercalation layer with a thermal expansion coefficient smaller than TiN is inserted between the dielectric layer and the top electrode (TiN) of the ferroelectric capacitor to provide larger tensile stress during annealing, thereby increasing the ratio of the o-phase component in the dielectric layer to achieve the purpose of increasing the remanent polarization and increase the memory window of the ferroelectric memory, thereby effectively preventing misreading of data and improving the reliability of the memory;
   wherein the metal protective layer is made of one of Pd, Au and Pt;
   wherein the annealing is performed at 400-500° C. in N2 for 20-30 s.

10. The $HfO_2$-based ferroelectric memory according to claim 9, wherein the $HfO_2$-based ferroelectric capacitor is prepared by the following steps:
- providing and cleaning a substrate layer;
- preparing a bottom electrode on the cleaned substrate layer by a sputtering process;
- depositing a dielectric layer on the bottom electrode;
- depositing an $Al_2O_3$ intercalation layer on the dielectric layer;
- applying a photoresist on the $Al_2O_3$ intercalation layer, exposing and developing;
- preparing a top electrode on the $Al_2O_3$ intercalation layer treated as above by a sputtering process;
- preparing a metal protective layer on the top electrode by a sputtering process; and
- removing the photoresist and excess metal, and annealing.

11. The $HfO_2$-based ferroelectric capacitor according to claim 1, wherein the substrate layer is made of $SiO_2$.

* * * * *